United States Patent
Kerr et al.

(10) Patent No.: US 6,824,320 B1
(45) Date of Patent: Nov. 30, 2004

(54) FILM CORE ARTICLE AND METHOD FOR MAKING SAME

(75) Inventors: Roger S. Kerr, Rochester, NY (US); Timothy J. Tredwell, Fairport, NY (US); Diane M. Carroll-Yacoby, Honeoye Falls, NY (US); Christopher L. DuMont, Rochester, NY (US); Peter M. Stwertka, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/702,161

(22) Filed: Nov. 5, 2003

(51) Int. Cl.[7] .............................................. G03B 17/26
(52) U.S. Cl. ...................... 396/512; 352/78 R; 242/348
(58) Field of Search ................................ 396/207–209, 396/511–513, 515; 352/78 R, 78 C; 242/335, 348, 348.4

(56) References Cited

U.S. PATENT DOCUMENTS

| | | | |
|---|---|---|---|
| 5,574,470 A | 11/1996 | de Vall | 343/895 |
| 5,859,587 A | 1/1999 | Alicat et al. | 340/572 |
| 5,939,984 A | 8/1999 | Brady et al. | 340/572.1 |
| 5,963,134 A | 10/1999 | Bowers et al. | 340/572.1 |
| 5,995,017 A | 11/1999 | Marsh et al. | 340/825.54 |
| 6,127,928 A | 10/2000 | Issacman et al. | 340/572.1 |
| 6,173,119 B1 * | 1/2001 | Manico et al. | 396/6 |
| 6,232,870 B1 | 5/2001 | Garber et al. | 340/10.1 |
| 6,247,857 B1 | 6/2001 | Wheeler et al. | 396/567 |
| 6,381,416 B2 | 4/2002 | Manico et al. | 396/207 |

* cited by examiner

Primary Examiner—W. B. Perkey
(74) Attorney, Agent, or Firm—Roland R. Schindler, II

(57) ABSTRACT

A film core article and methods for making the same are provided. The film core article has a generally cylindrical outer surface adapted to receive said length of film, said outer surface further comprising a recess formed in the outer surface and shaped to receive a housing of a circuitry chip of a radio-frequency transponder provided on a flexible substrate that is joined to the outer surface before the core receives the length of film.

25 Claims, 4 Drawing Sheets

FILM CORE ARTICLE AND METHOD FOR MAKING SAME

FIELD OF THE INVENTION

The invention relates generally to a film core of the type that is adapted to receive a film medium.

BACKGROUND OF THE INVENTION

Radio frequency identification (RFID) tags have been used and proposed for many uses in warehousing, inventory control, process tracking, article surveillance and vehicle identification. Such RFID tags typically comprise a radio frequency transponder, an antenna, and a memory positioned on a substrate such as glass, plastic, or flexible film. A few examples of uses proposed for RFID tag technology include the following: U.S. Pat. No. 5,995,017 (Marsh et al.) discloses RFID tag use in an identification system; U.S. Pat. No. 5,859,587 (Alicot et al.) and U.S. Pat. No. 5,939,984 (Brady et al.) disclose RFID tag applications for electronic article surveillance; U.S. Pat. No. 6,232,870 (Garber et al.) discloses an application for library materials tagged with RFID devices and scanned using a handheld reader, U.S. Pat. No. 5,963,134 (Bowers et al.) discloses an inventory system that employs RFID tags attached to individual articles, especially suitable for library check-out applications; and, U.S. Pat. No. 6,127,928 (Issacman et al.) discloses a method and apparatus for using RFID tags for document tracking in office environments.

Different types of RFID devices have been developed. For low-cost applications with flexible substrate materials that are produced in high volumes, such as motion picture film or magnetic films, the following types of RFID devices are of particular interest:

(a) Capsule Types.

RFID transponders of the capsule type contain an RFID transponder encased in glass or plastic and can be easily attached to packaging components. Some examples of this type of RFID transponder are 32 mm Glass Transponders and 120 mm Cylindrical Transponders from Texas Instruments, Inc., Dallas, Tex.

(b) Flexible Substrate Types.

Provided on some type of flexible substrate, such as a polymer tape, these types of RFID transponders can be provided in ultra-thin versions, suitable for use in ID cards, luggage devices, and merchandising applications, for example. An example of this type of RFID transponder is disclosed in U.S. Pat. No. 5,574,470 (de Vall). These types of RFID transponder can be provided on reels, in a peel-and-stick configuration. Tag-It Inlays from Texas Instruments are one familiar product line providing this type of RFID transponder. The self-adhesive capability of the Tag-It inlay is particularly attractive for many of the prior art applications noted above. An RFID transponder of this type can be unobtrusively attached to a surface and hidden from view to help prevent tampering or removal. These devices have a limited bend radius, typically not less than about 0.75 in.

The cost of RFID devices varies widely, depending on factors such as whether or not these devices contain a battery, the amount of memory provided, read/write capability, antenna configurations, and packaging. The least expensive alternative is the flexible substrate type, having a price that is a small fraction of the price for capsule types.

It is recognized that there would be advantages in attaching RFID transponders to film media, such as motion picture film, to provide memory for improved tracking, management, and processing of the film medium. One way to accomplish this object without joining a transponder to the film medium itself is to associate the transponder with packaging that travels with the film.

Many types of film, including photographic, magnetic films, are provided on a film core. The film core, therefore, becomes an ideal carrier for attachment of the RFID transponder. For example, commonly assigned U.S. Pat. No. 6,247,857 (Wheeler et al.) discloses use of an RFID transponder in a system for tracking the processing of photographic film and commonly assigned U.S. Pat. No. 6,381,416 (Manico et al.) each show valuable and commercially viable approaches for using an RFID tag in conjunction with a film core. However, approaches other than those disclosed therein may also have value. In particular, there is a continuing need in the art for film core/memory systems that meet the following design considerations:

(a) Low Cost of Introduction.

Film cores are a commodity item, manufactured by the thousands. A single user of such cores may purchase hundreds or thousands of the cores. Thus the unit cost of such firm core/memory systems must be low. Moreover, existing film cores can be re-used, so that, short of being damaged in some way, the conventional plastic film core has a lifetime spanning a number of years. Thus, users of existing cores will desire a low cost method for adapting existing film cores for use in forming film core/memory systems. Glass capsule types of RFID transponder do not require an external antenna. However, these devices are several times the cost of RFID transponders on flexible substrate.

(b) Film Core Geometric Limitations.

RFID transponders provided on flexible substrate, however, are not designed for being tightly curled up in confined spaces and a minimum radius of curvature is required. Further, antenna requirements make it necessary that these devices be disposed on a flat or curved surface, without self-overlapping, to allow for the maximum available antenna length. Thus, there is a limited area on a film core on which a flexible substrate type RFID transponder can be joined.

(c) Sensitivity of the Film to Irregularities on the Core Surface.

Depending on film thickness and composition, the film substrate can be highly sensitive to irregularities in the core surface. For some types of film, irregularities in the core surface, communicated through each overlaid wrapping of the film on the core, can cause performance problems. For motion picture film, for example, an irregularity in the core can be transferred through several feet of film and can cause perceptible, periodic image aberrations that repeat in a predictable and annoying cycle.

The antenna length requirements consideration noted in (b) above prevents the use of an inexpensive RFID transponder on a flexible substrate wrapped tightly within the film core or within a small section of film core. While this type of RFID transponder could be adhered to either of the side faces of a film core, there is an increased risk of damage to the RFID transponder. Further, adhesion of a flexible substrate type RFID to this surface could interfere with the mounting of the film core in a film magazine or processing apparatus.

Because of the film sensitivity consideration noted in (c) above, simply adhering an RFID transponder on a flexible substrate directly to the outer cylindrical core surface, can, in some circumstances cause undesirable influences on film 10. In particular, the circuitry component of such an RFID transponder can create a surface irregularity that could be transmitted through a meaningful portion of motion picture film, causing an undesirable, repetitive imaging anomaly in that portion.

Thus, while in many ways, the attachment of an RFID transponder to a film core would appear to provide a uniquely valuable solution for tracking movement of a film throughout processing, there are several design considerations that must be addressed in doing so. Thus, what is needed is a film support system comprising a film core and a transponder that addresses the cost considerations, geometric considerations, and film sensitivity considerations described above.

SUMMARY OF THE INVENTION

In one aspect of the invention, what provides a film core article for carrying a length of film. The film core comprising a generally cylindrical outer surface adapted to receive said length of film, said outer surface further comprising a recess formed in the outer surface and shaped to receive a housing of a circuitry chip of a radio frequency transponder provided on a flexible substrate that is joined to the outer surface before the core receives the length of film.

In another aspect of the invention, what is provided is a film core article for carrying the length of film core. The film core article comprises a cylindrical outer surface of a film core for carrying the length of film wound thereon; said outer surface having a recess therein. A radio-frequency transponder on a flexible substrate is adhered to the cylindrical outer surface of the film core, said radio frequency transponder comprising an antenna and a radio frequency communication system having a housing fitting at least in part in said recess, so that said flexible substrate provides a generally uniform exterior surface to receive the length of film.

In still another aspect of the invention, what is provided is a film core article, comprising a radio frequency transponder fitted into a film feed slot in a cylindrical outer surface of a film core and an antenna connected to said radio frequency transponder, said antenna fabricated on a flexible substrate and wrapped circumferentially about the cylindrical outer surface of the film core.

In a further aspect of the invention, what is provided is a film core article comprising a film core having an outer wall with an exterior surface defining a generally cylindrical shape; and a transponder joined to the exterior surface, said transponder having a transceiver circuit and a memory circuit contained within a transponder housing, said housing having a housing thickness; an antenna joined to the transponder housing having an antenna thickness, and electrically cooperating with the transceiver circuit; and a substrate joined to the exterior surface of the film core, said substrate having a film engagement surface on one side of the substrate and an outer surface on the other side, with a substrate thickness defined between the sides, said substrate having the transceiver circuit and memory circuit provided wherein at least one of the outer wall, the antenna layer and the substrate has a recess defined therein to receive at least a part of the transponder housing so that the outer surface does not have a protrusion caused by the transponder housing.

In yet another aspect of the invention, what is provided is a method for forming a film core as a carrier for a radio frequency transponder. In accordance with the method a recess is formed in a cylindrical outer surface of a core said recess shaped to receive, at least in part, a housing containing transponder circuitry for a radio frequency transponder. The radio frequency transponder is affixed to the cylindrical outer surface of the core, with said housing being at least partially positioned within said recess.

In a further aspect of the invention, a method for forming a film core as a carrier for a radio frequency transponder, the method comprising the steps of inserting a transponder circuitry component of the radio frequency transponder into a film feed slot in the cylindrical outer surface of the film core and wrapping an antenna component of the radio frequency transponder circumferentially about the cylindrical outer surface of the filmcore said antenna connected to said radio frequency transponder circuitry component, said antenna fabricated on a flexible substrate.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
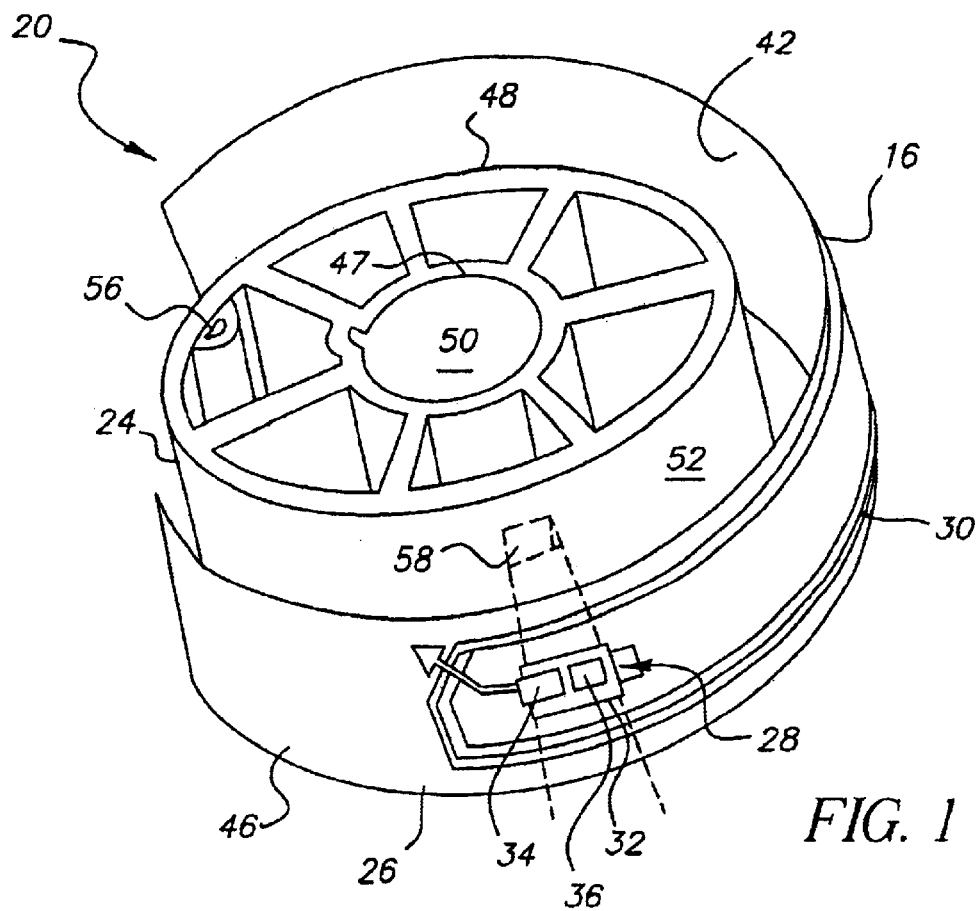
FIG. 1 is an exploded view showing one embodiment of film core article.
Figure 2:
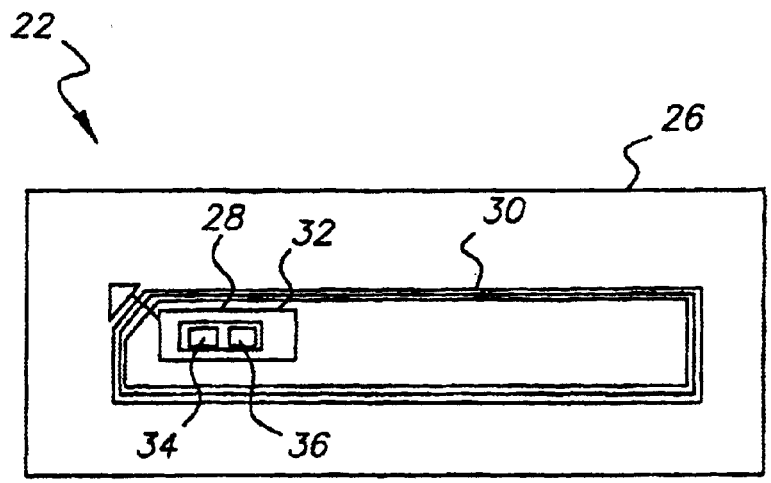
FIG. 2 is a plane view showing the transponder of FIG. 1.
Figure 3:
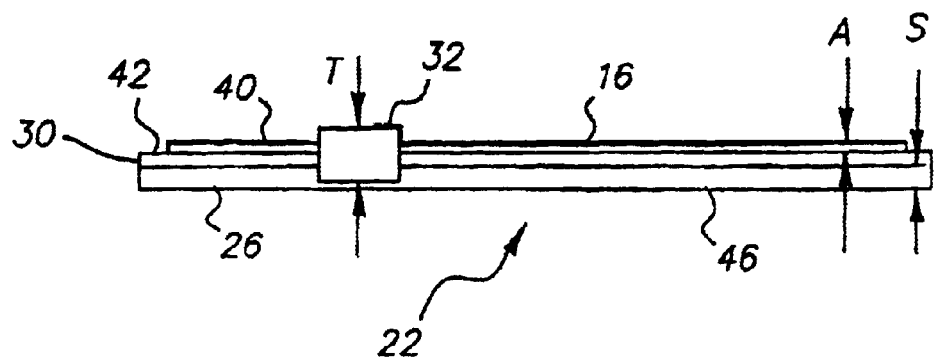
FIG. 3 is a side view showing the transponder of FIG. 2.

Referring to FIGS. 1–3 there are shown a perspective view, a plane view and a side view, respectively, of a film core article 20 of the present invention. As is shown in FIG. 1, film core article 20 comprises a radio frequency transponder 22 and a film core 24.

Transponder 22 comprises a flexible substrate 26 on which a transponder circuit 28 and an antenna 30 installed. Typically, transponder circuit 28 takes the form of a packaged semiconductor product having a housing 32 that contains a radio frequency communication system 34 and a memory 36. As is shown in FIGS. 1–3, antenna 30 typically takes the form of a patterned layer of a conductive material such as a metal foil or film. Antenna 30 is electrically connected to the radio frequency communication system 34 and cooperates therewith to send and receive radio frequency signals. In one embodiment, radio frequency communication system 34 converts at least a portion of energy from the received radio frequency signals into energy that is used to operate transponder circuit 28, including but not limited to radio frequency communication system 34 and/or memory 36.

Flexible substrate 26 can be any type of nonconductive substrate. In the embodiment shown in FIGS. 1–3 flexible substrate 26 comprises a transparent polymer tape to which a coating of adhesive material 40 is applied. However, flexible substrate 26 need not be transparent and can be formed using other materials papers, films, fabrics and other materials. As is shown in FIG. 1, antenna 30 and housing 32 are deposited onto a component side 42 of flexible substrate 26. Typically, the coating of adhesive material 40 is also applied to the component side 42 of flexible substrate 26. In this way, transponder 22 can be adhesively joined to an object to which transponder 22 is to be physically associated, with flexible substrate 26 providing on component side 42, the components necessary to perform the functions of transponder 22 as well as adhesive material 40 that joins transponder 22 to the object. This arrangement encases antenna 30 and housing 32 between the object to which the transponder 20 is to be joined and flexible substrate 26. This helps to protect antenna 30 and housing 32 from possible damage and interference due to exposure to contaminants, water, mechanical damage and other environmental circumstances that could impact the operation of transponder 22 while transponder 22 is joined to the object. An exterior surface 46 on flexible substrate 26 is also provided and can be treated or otherwise processed to resist environmental conditions or to cooperate with external structures.

As is shown in FIG. 3 housing 32 has a generally rectangular shape with a transponder thickness T that can be, for example, in the 0.36 mm range. However, flexible substrate 26 typically has a substrate thickness S that is less than thickness T, for example, S can be in the 0.3 mm range. Similarly, antenna 30 typically has an antenna thickness A that is also less than thickness T and, for example, can be less than 0.06 mm. Thus as can be anticipated housing 32 projects above adjacent portions of transponder 22.

In the embodiment shown in FIGS. 1, 2 and 3, film core 24 has an inner wall 47 defining an inner area 50 that is used to join film core 24 to processing, storage and/or capture equipment. Film core 24 also has an outer wall 48 having a generally cylindrical outer surface 52 that is adapted to engage a film medium (not shown) such as a photosensitive film, radiological film, magnetic recording film, optical film, a thermal printer donor, a thermal printer receiver, photographic paper, ink jet receiver, laser donor material, laser receiver media, flexible circuit board films, and/or other known film types. In this regard, outer surface 52 is shown having an optional film feed slot 56 that receives an end of the film medium to help mechanically join film medium to film core 24 in a process known as cinching. Film core 24 can optionally incorporate structures that are useful in the cinching process, as is known in the art.

Figure 4:
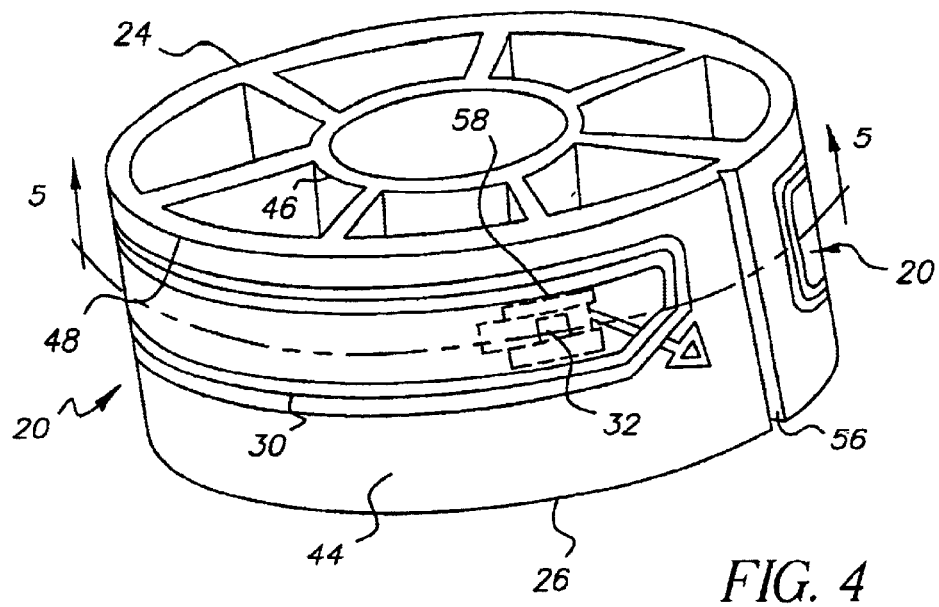
FIG. 4 is a perspective view showing the film core article of FIGS. 1, 2, and 3 film core having the transponder attached.

FIG. 4 shows a perspective view of the embodiment of film core article 20 of FIGS. 1, 2 and 3 in an assembled form. As is shown in FIGS. 1–4, transponder 22 is wrapped about outer surface 52 (not shown in FIG. 4 of film core 24 and held thereon by adhesive material 40 or in some other manner. When disposed about outer surface 52, antenna 32 has a beneficial configuration for communication with a transceiver (not shown).

Figure 5:
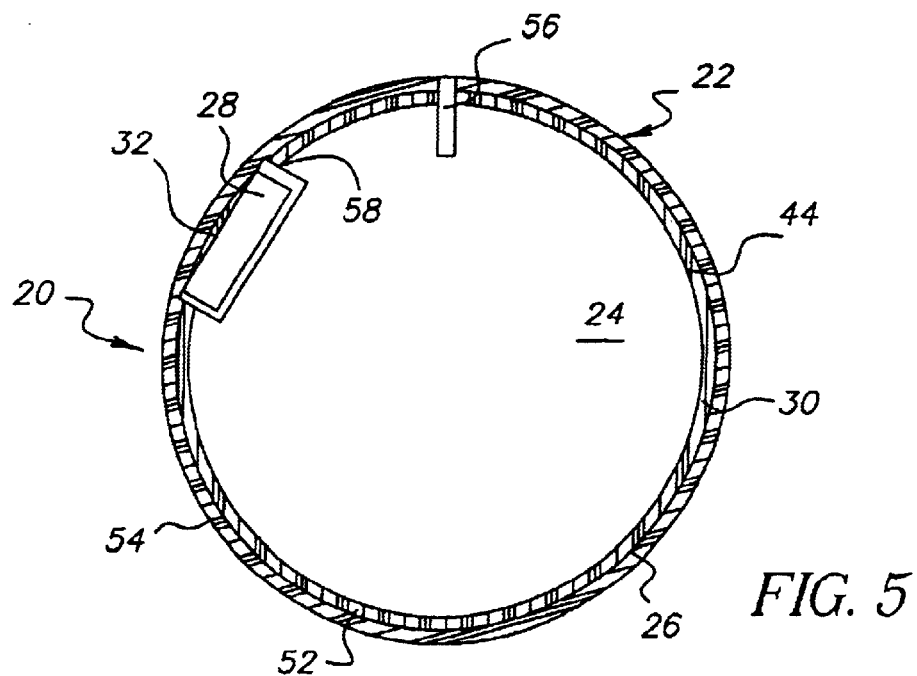
FIG. 5 is a cross section view showing the film support of FIGS. 1–4.

FIG. 5, provides a cross-section view of the embodiment of film core article 20 shown in FIGS. 1–4. As is shown in FIG. 5, when transponder 22 is joined to outer surface 52, outer surface 52 is covered by transponder 22, and exterior surface 44 of transponder 22 now becomes a surface upon which a film medium can be stored. As is shown in FIGS. 1 and 5, outer surface 52 of film core 24 has a recess 58 to receive at least a portion of housing 32 to prevent housing 32 from forming a protrusion in exterior surface 44. As shown in the dashed lines of FIG. 1, housing 32 is aligned with recess 58 as transponder 22 is joined to outer surface 52. Recess 58 is sized and shaped so that enough of housing 32 can be received in recess 58 to permit exterior surface 44 of transponder 22 to provide a uniform surface for film winding.

In the embodiment shown in FIGS. 1–5, the length of flexible substrate 26 is preferably sufficient to wrap completely about outer surface 52 of film core 24 from one edge of slot 56 to another edge of slot 56. A full wrap of flexible substrate 26 is preferred even where thickness T closely matches the thickness of flexible substrate 26. Using a full wrap eliminates a gap that would be formed at the ends of flexible substrate 26 and that could also form undesirable artifacts on a film medium loaded onto film core article 20.

Advantageously for manufacturing purposes, recess 58 can be molded into film core 12 by adding a protruding feature in a mold used to produce new film cores 24. Existing film cores 24 can also be adapted to provide a recess 58 by extracting, oblating, drilling, notching, cutting or otherwise removing material from outer surface 52, such as by drilling or notching, for example. Thus, there is no need to discard existing film cores 24 when introducing the methods and articles of the present invention into the production, processing or editing environments.

Figure 6:
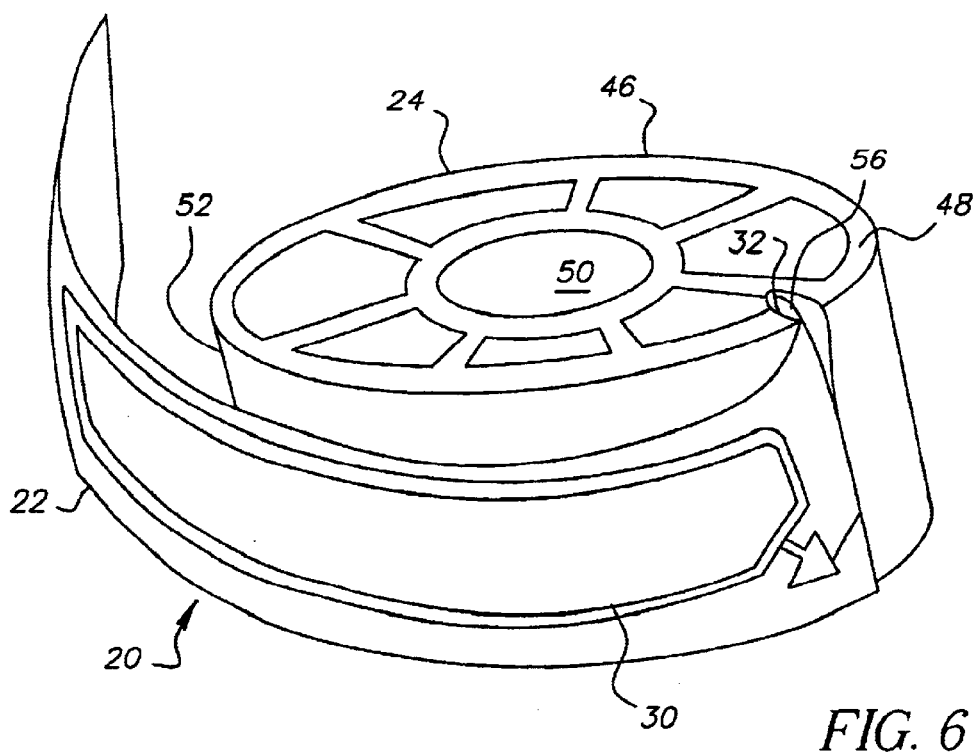
FIG. 6 is a perspective view showing an alternate embodiment of a film core article having an attached transponder.

Referring to FIG. 6, an alternate embodiment of a transponder 22 formed on a flexible substrate 26 is shown, wherein housing 32 is fitted within slot 56. In this embodiment, therefore, slot 56 can be used both to receive a film medium (not shown) for cinching as described above and as a recess 58 to hold transponder housing 32. In this regard, housing 32 can be adapted for storage in slot 56. In an alternative embodiment, housing 32 can be adapted to occupy a portion of slot 56 such that slot 56 cannot be used to hold film medium for the aforementioned cinching operation.

Where this is done, alternative methods for securing a film medium to film core article 20 can be used. Such techniques include but are not limited to those that are described in commonly assigned U.S. patent application Ser. No. 10/460, 522 entitled Winding Apparatus Having Bernoulli Guide Chute Roller-Core Nip and Method, filed by Watkins et al on Jun. 12, 2003, which describes a winding apparatus having a rotary element, such as a core, that is rotatable about a winding axis. A roller is disposed adjoining the rotary element. The roller and rotary element together define a nip. A guide shoe has a chute wall and a plenum. The chute wall is aligned with the nip. The chute wall has an inner end disposed between the roller and the rotary element and an outer end spaced from the roller. The chute wall has a plurality of bores communicating with the plenum. In use, gas blown through the bores propels a web to the nip in a fluid film. The free end of the web is guided from an outfeed end of the nip in a loop to a second position adjoining the inner end of the guide shoe. During the guiding, the rotary element is rotated against the loop. This continues until the web overlaps and is cinched. Other techniques can also be used.

It will be appreciated that slot 56, which is conventionally provided in film core 24, may require enlargement in order to accommodate housing 32.

Figure 7:
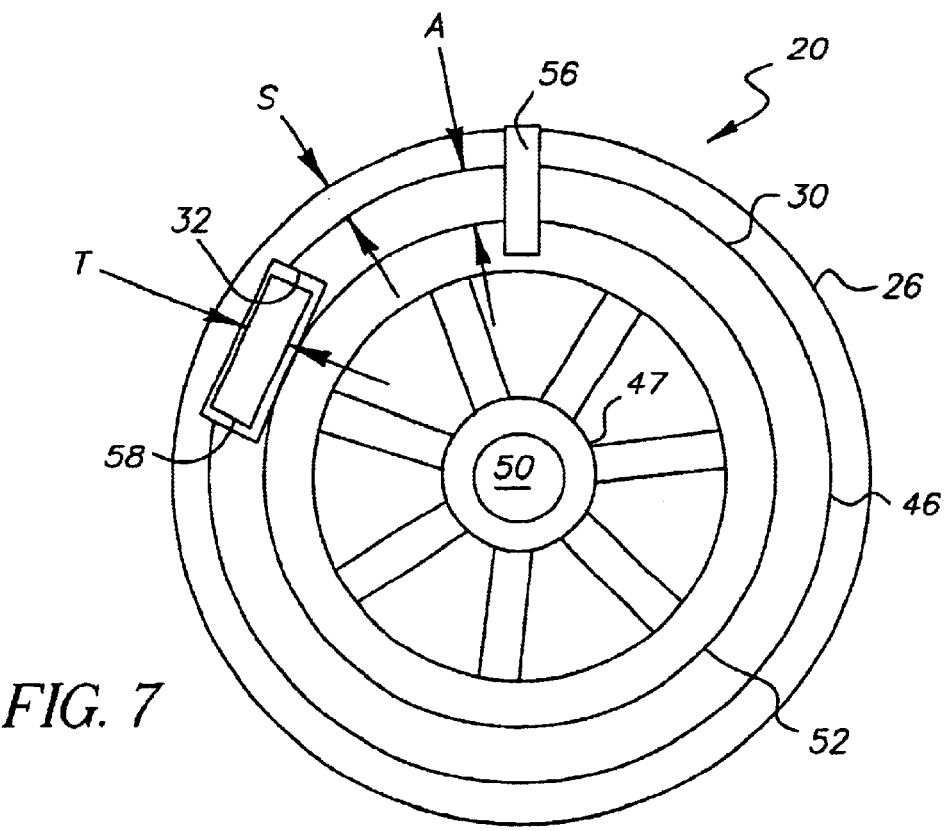
FIG. 7 shows yet another embodiment of a film core article of the invention.

FIG. 7 shows another alternate embodiment of the present invention. In this embodiment of film core article 20, outer surface 52 of film core 24 is not modified to have a recess.

However in this embodiment, the thickness A of antenna 30 and/or the thickness S of flexible substrate 26 are defined to have, in combination, a thickness that is equal to or greater than the thickness T of transponder housing 32. Recess 58 is formed in one or both of flexible substrate 26, antenna 30, and is dimensional so that housing 32 does not create a protrusion.

Figure 8:
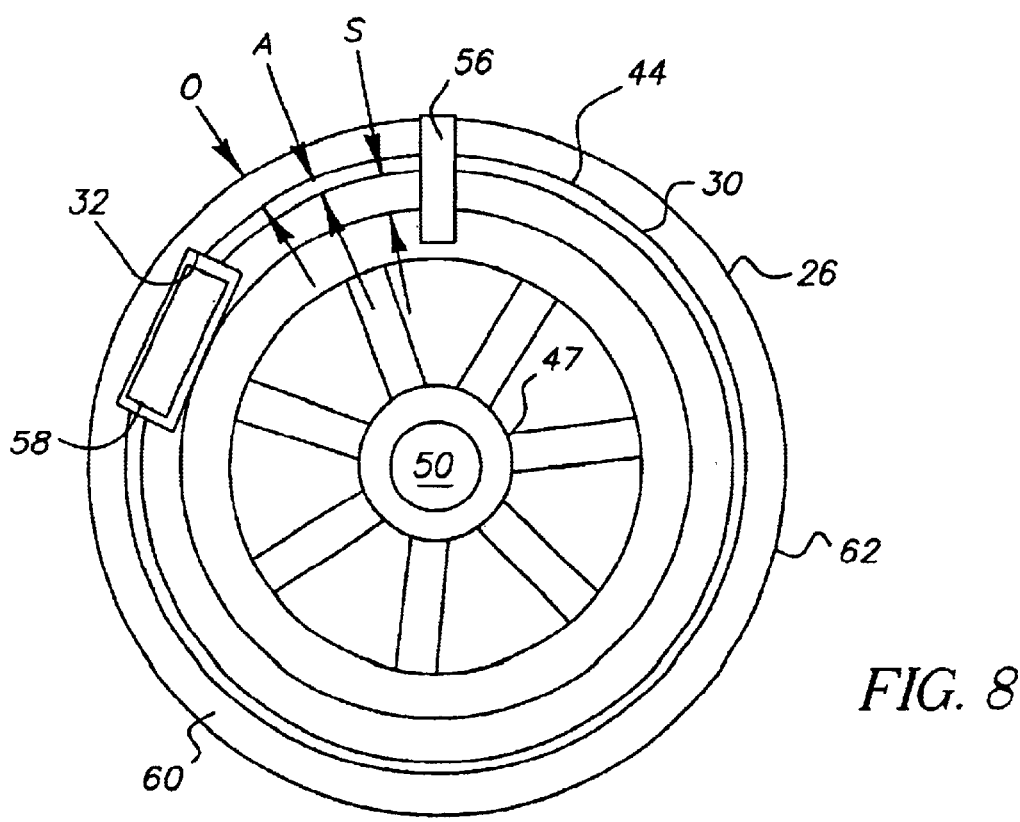
FIG. 8 shows still another embodiment of a film core article of the invention.

FIG. 8 shows still another alternate embodiment of the present invention. In this alternative embodiment, an additional layer 60 is applied to exterior surface 44 so that a film engagement surface 62 can be provided that does not have a protrusion thereon. In this embodiment a conventional radio frequency transponder 22 of appropriate dimension is used. Additional layer 60 is applied over exterior surface 44 of transponder 22 and arranged so that the position of recess 64 of additional layer 60 corresponds with the position transponder housing 32 so that additional layer 60 provides a generally uniform engagement surface 62 upon which a film medium (not shown) can rest. Additional layer 60 can comprise a material that is coated onto exterior surface 44, or applied in the form of a tape or spray. Additional layer 60 can also comprise housing or attachment to film core 24 having the arrangement of a recess 64 as described above.

It will be appreciated that in the embodiments of FIGS. 6, 7, and 8 different combinations of thickness A, S and/or the thickness O of additional layer 60 can be used to provide an exterior surface 44 or an engagement surface 62, respectively, having a generally uniform outer surface adapted to receive a film medium.

It will also be appreciated that antenna 30 comprises a patterned arrangement of conductors and that in certain instances, this patterned arrangement can cause protrusions. This issue can be addressed in a variety of ways. In one embodiment adhesive material 44 is provided to fill in areas adjacent to antenna pattern 30 so as to provide support for flexible substrate 26 when transponder 22 is joined to film core 24. Alternatively, antenna 30 can be patterned in a way that reduces or eliminates such an effect. In still other embodiments, flexible substrate 26 or additional layer 60 can be supplied in a way that compensates for protrusions potentially formed by antenna 30.

Although transponder 22 has been shown in the embodiments of FIGS. 1–8 as having an adhesive layer 40 used to join transponder 22 film core 24 other methods of attachment can be used, including but not limited to, chemical attachment, electrical attachment, magnetic attachment, and/or other forms of physical attachment.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

Thus, what is provided is a film support, a film core and a method for assembling a film core adapted to cooperate with a radio frequency transponder transponder.

Parts List 20 film core article
22 radio frequency transponder
24 film core
26 flexible substrate
28 transponder circuit
30 antenna
32 housing
34 radio frequency communication system
36 memory
40 adhesive material
42 component side
44 exterior surface
46 exterior surface
47 inner wall
48 outer wall
50 inner area
52 outer surface
56 slot.
58 recess
60 additional layer
62 engagement surface

What is claimed is:

1. A film core article for carrying a length of film the film core comprising a generally cylindrical outer surface adapted to receive said length of film, said outer surface further comprising a recess formed in the outer surface and shaped to receive a housing of a circuitry chip of a radio frequency transponder provided on a flexible substrate that is joined to the outer surface before the core receives the length of film.

2. The film core article of claim 1 wherein said recess is a hole drilled into the cylindrical outer surface of the film core.

3. The film core article of claim 1 wherein said recess is molded into the cylindrical outer surface of the film core.

4. The film core article of claim 1 wherein the transponder is adhesively attached to the cylindrical outer surface of the film core.

5. The film core article of claim 1 wherein said flexible substrate has an adhesive layer for holding the transponder to the outer surface of the film core.

6. The film core article of claim 1 wherein said recess is a hole notched into the cylindrical outer surface of the film core.

7. The film core article of claim 1 wherein the film is a motion picture print film.

8. The film core article of claim 1 wherein the film is a motion picture negative film.

9. The film core article of claim 1 wherein the film is a magnetic tape.

10. A film core article for carrying the length of film, the film core article comprising:
   a cylindrical outer surface of a film core for carrying the length of film wound thereon; said outer surface having a recess therein; and;
   a radio-frequency transponder on a flexible substrate adhered to the cylindrical outer surface of the film core, said radio frequency transponder comprising an antenna and a radio frequency communication system having a housing fitting at least in part in said recess, so that said flexible substrate provides a generally uniform exterior surface to receive the length of film.

11. The film core article of claim 10 wherein said recess is a hole drilled into the cylindrical outer surface of the film core.

12. The film core article of claim 10 wherein said recess is molded into the cylindrical outer surface of the film core.

13. The film core article of claim 10 wherein said flexible substrate has an adhesive layer for holding the transponder to the outer surface of the film core.

14. A film core article, comprising:
   a radio frequency transponder fitted into a film feed slot in a cylindrical outer surface of a film core; and
   an antenna connected to said radio frequency transponder, said antenna fabricated on a flexible substrate and wrapped circumferentially about the cylindrical outer surface of the film core.

15. The film core article of claim 14 wherein said flexible substrate has an adhesive layer for holding the transponder to the outer surface of the film core.

16. The film core article of claim 14 wherein said flexible substrate is a polyester.

17. A film core article comprising:

a film core having an outer wall with an exterior surface defining a generally cylindrical shape; and a transponder joined to the exterior surface, said transponder having a transceiver circuit and a memory circuit contained within a transponder housing, said housing having a housing thickness;

an antenna joined to the transponder housing having an antenna thickness, and electrically cooperating with the transceiver circuit; and a substrate joined to the exterior surface of the film core having a film engagement surface on one side of the substrate and an outer surface on the other side, with a substrate thickness defined between the sides, said substrate having the transceiver circuit and memory circuit provided thereon;

wherein at least one of the outer wall, the antenna and the substrate has a recess defined therein to receive at least a part of the transponder housing so that the outer surface does not have a protrusion caused by the transponder housing.

18. The film core article of claim 17, wherein the combined thickness of the outer wall, antenna and substrate is greater than the thickness of the housing.

19. The film core article of claim 17 wherein said antenna has a pattern and wherein at least one of the substrate and the outer wall has a space defined therein to receive the antenna so that the outer surface does not have a protrusion caused by the antenna pattern.

20. The film core article of claim 17 wherein said antenna has a pattern and wherein a thickness of a non-conductive material is located in gaps in antenna pattern so that the outer surface does not have a protrusion caused by the antenna pattern.

21. A method for forming a film core as a carrier for a radio frequency transponder, the method comprising the steps of:

forming a recess in a cylindrical outer surface of a core said recess shaped to receive, at least in part, a housing containing transponder circuitry for the radio frequency transponder; and affixing the radio frequency transponder to the cylindrical outer surface of the core, with said housing being at least partially positioned within said recess.

22. The method of claim 21 wherein the step of forming said recess comprises the step of drilling a hole in the outer surface of the film core.

23. The method of claim 21 wherein the step of affixing the radio frequency transponder comprises the steps of removing a protective layer from a peel-and-stick radio frequency transponder and joining the peel-and-stick radio frequency transponder.

24. A method for forming a film core as a carrier for a radio frequency transponder, the method comprising the steps of:

inserting a transponder circuitry component of the radio-frequency transponder into a film feed slot in the cylindrical outer surface of the film core; and, wrapping an antenna component of the radio-frequency transponder circumferentially about the cylindrical outer surface of the film core, said antenna connected to said radio frequency transponder circuitry component, said antenna fabricated on a flexible substrate.

25. The method of claim 20 wherein the step of wrapping an antenna comprises the step of adhering said flexible substrate to the cylindrical outer surface of the film core.

* * * * *